United States Patent Office 3,104,265
Patented Sept. 17, 1963

3,104,265
METHOD OF MANUFACTURING
6-ETHOXY-m-ANOL
Alberto Fiecchi, Turin, Italy, assignor to Collins Chemical Co. Inc., New York, N.Y.
No Drawing. Filed Jan. 29, 1960, Ser. No. 5,358
Claims priority, application Italy Nov. 10, 1959
3 Claims. (Cl. 260—613)

This invention relates to the manufacture of 6-ethoxy-m-anol (also referred to as propenylguaethol or 3-hydroxy-4-ethoxy-propanylbenzene) which has been long known (C. Junge; Riechstoffindustrie und Kosmetik 8, 61, April 1933) and employed on account of its aromatic properties.

The above compound is commercially manufactured by saponifying 4-ethoxy-3-methoxy-propenyl-benzene by means of an alkaline hydroxide in a solvent comprising ethanol or methanol. Saponification is carried out at a temperature ranging between 150–190° C. in an autoclave at superatmospheric pressure and requires a period of time ranging between 4 and 15 hours.

A first object of this invention is to provide a method of manufacturing propenyl-guaethol by saponifying 4-ethoxy-methoxy-propenyl-benzene in which the reaction time is appreciably reduced.

A second object of this invention, in conjunction with the previous object, is to avoid the necessity for an autoclave and high superatmospheric pressures during saponification.

Further objects, features and advantages of this invention will result from the appended description and specific examples included therein, it being understood that said examples are given merely by way of illustration and do not in any way limit the scope of this invention.

According to a broad aspect of this invention the improved process consists in saponifying 4-ethoxy-3-methoxy-propenyl-benzene by means of an alkali in the absence of water at a temperature ranging between 150 and 250° C. in an organic solvent having at least one hydroxyl function, capable of dissolving the alkali employed and having a boiling point ranging between 150° C. and 300° C.

The preferred solvent is ethylene-glycol. However, it has been found that other solvents can be employed such as propylene glycol as well as dimers, trimers, tetramers, hexamers of said two glycols, and their monoethyl-, monoethyl-, monopropyl- and monobutyl-ethers. Further suitable solvents are ethanolamine and diethanolamine and their N-alkyl-derivatives; furfuryl and tetrahydrofurfuryl alcohols; 1-4-butandiol, hexamethylene-glycol, triethanolamine, glycerine and sorbitol. Of course, if desired, mixtures of the abovementioned solvents can be employed.

I can employ as alkali sodium and potassium hydroxide in which case the methyl alcohol generated during the progress of reaction should be removed by distillation. Moreover, I can employ as alkali the sodium and potassium salts of the abovementioned solvents, and in such case distillation of methanol is not necessary. Saponification is carried out at room pressure or approximately room pressure.

For the success of the method the solvent employed in addition to dissolving alkali need not necessarily be capable of dissolving 4-ethoxy-3-methoxy-propenyl-benzene. Should the mixture of these three ingredients be heterogeneous it will be sufficient to equip the reaction vessel with a suitable stirrer in order to stir the mixture during the whole saponification period.

Example 1

46 grams sodium metal are dissolved in 380 ml. ethylene-glycol, whereupon 50 grs. 4-ethoxy-3-methoxy-propenyl-benzene is added, the mixture being heated while stirring and boiled during one hour.

The mixture is then cooled to 80° C., the nonsaponified starting compound being separated by adding to the mixture 80 ml. concentrated hydrochloric acid and 200 grs. ice, thereupon shaking with 100 ml. benzene. The benzene solution permits of recovering 7.8 grs. of the unreacted 4-ethoxy-3-methoxy-propenyl-benzene, the alkaline solution being decomposed with ice, the hydrochloric acid giving rise to a precipitate, which upon drying in air, weighs 35 grs. This precipitate is crystallized from diluted acetic acid, thereby obtaining 6-ethoxy-m-anol, M.P. 85–86° C.

Example 2

80 grs. sodium hydroxide are dissolved in 180 ml. ethylene-glycol. The solution is heated and a water-glycol mixture is distilled at 20 mm. Hg until the boiling temperature reaches 108° C. At this stage room pressure is re-established, the solution is heated to 218° C., 50 grs. 4-ethoxy-3-methoxy-propenyl-benzene are added and, while the abovementioned temperature is maintained, a mixture of ethylene-glycol and methyl-alcohol is distilled from a short fractionating column during 40 minutes.

The succeeding procedure is according to Example 1, 6.5 grs. of unreacted starting compound being recovered and 38 grs. precipitate being obtained. The latter is crystallized from diluted acetic acid, thereby obtaining 6-ethoxy-m-anol, M.P. 85.5–86° C.

Example 3

This example is given by way of comparison and illustrates the technique known in the art.

25 grs. 4-ethoxy-3-methoxy-propenyl-benzene, 43 grs. sodium hydroxide and 150 ml. methyl-alcohol are placed in an autoclave capable of withstanding 20 atmospheres and stirred during 14 hours and at 170° C., and allowed to cool. The autoclave is opened, the mixture is decomposed with ice and hydrochloric acid. The resulting product weighs upon drying 18.5 grs. The latter is crystallized in aqueous isopropyl-alcohol, whereby 6-ethoxy-m-anol is obtained, M.P. 84.5–85° C.

Comparison of Example 3 and the previous examples clearly shows the advantages of this invention, more particularly the shortness of time required by saponification and economy in heat and mechanical power inherent thereto, as well as the possibility of avoiding processing at superatmospheric pressure, hence of using autoclaves, compressors and equipment therefor. In respect of the saponification period which in example 2 is 40 minutes only, it was ascertained that it can be further shortened by employing solvents of a higher boiling point, such as triethylene-glycol (B.P. 280° C.) and processing at temperatures ranging between about 230° and 250° C. Under the latter conditions the saponifying period was around 25–30 minutes. It should further be noted at this stage that 6-ethoxy-m-anol can be obtained, as is well known, by isomerization of 4-ethoxy-3-methoxy-3-allyl-benzene in an alcohol-alkaline solution. In this connection it was ascertained that said isomerization can be carried out jointly with the abovementioned saponifying process in a single step which starting from 4-ethoxy-3-methoxy-allyl-benzene yields as an intermediate product 4-ethoxy-3-methoxy-propenyl-benzene which is saponified in the same reaction medium yielding propenyl-guaethol. The whole process is satisfactorily carried out at atmospheric pressure and requires a period ranging between 40 and 90 minutes according to reaction temperature, i.e. the solvent employed being selected from among the solvents mentioned in this specification.

What I claim is:

1. A method of manufacturing 6-ethoxy-m-anol consisting of saponifying 4-ethoxy-3-methoxy-propenyl-benzene by means of an alkali in the absence of water, at a boiling temperature ranging between 150° and 250° C. in an organic solvent selected from the group consisting of ethylene-glycol, propylene-glycol, dimers, trimers, tetramers, hexamers thereof and monomethyl-, monoethyl-, monopropyl- and monobutyl-ethers thereof ethanolamine, diethanolamine and N-alkyl-derivatives thereof, furfuryl and tetrahydrofurfuryl alcohols, 1-4-butandiol, hexamethylene-glycol, triethanolamine, glycerine and sorbitol, said alkali being selected from the group consisting of sodium hydroxide, potassium hydroxide, and sodium and potassium salts of said solvents, said boiling being effected at a pressure of at most substantially atmospheric pressure.

2. A method of manufacturing 6-ethoxy-m-anol consisting of saponifying 4-ethoxy-3-methoxy-propenyl-benzene in a liquid reaction medium consisting of ethylene glycol and a sodium salt of said ethylene glycol at a temperature between 150° and 250° C. while boiling the reaction mixture at said temperature, said boiling being effected at a pressure of at most substantially atmospheric pressure.

3. A method of manufacturing 6-ethoxy-m-anol consisting of saponifying 4-ethoxy-3-methoxy-propenyl-benzene in a liquid reaction medium consisting of ethylene glycol and a sodium salt of said ethylene glycol by boiling the reaction mixture at atmospheric pressure.

References Cited in the file of this patent

UNITED STATES PATENTS

| 1,704,494 | Boedecker | Mar. 5, 1929 |
| 2,663,741 | Joffre | Dec. 22, 1953 |

OTHER REFERENCES

Li: Chemical Engineering, vol. 65 (1958), pp. 151–156 $TN_1M_4$.